Sept. 23, 1958     C. F. BAIR     2,853,089
DISASTER VALVE ATTACHMENT
Filed Jan. 11, 1954     2 Sheets-Sheet 1
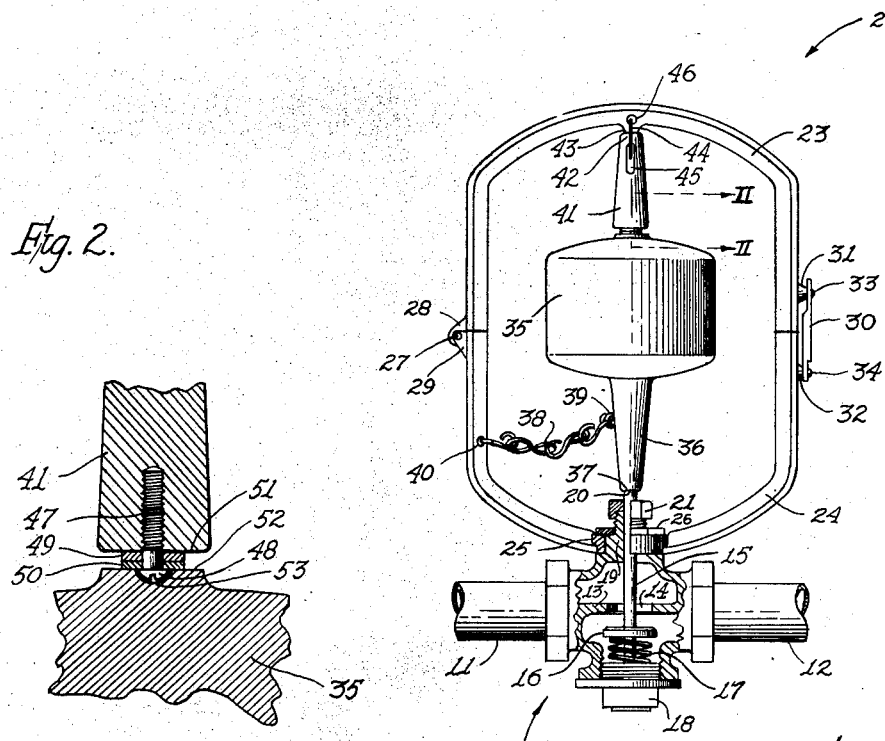
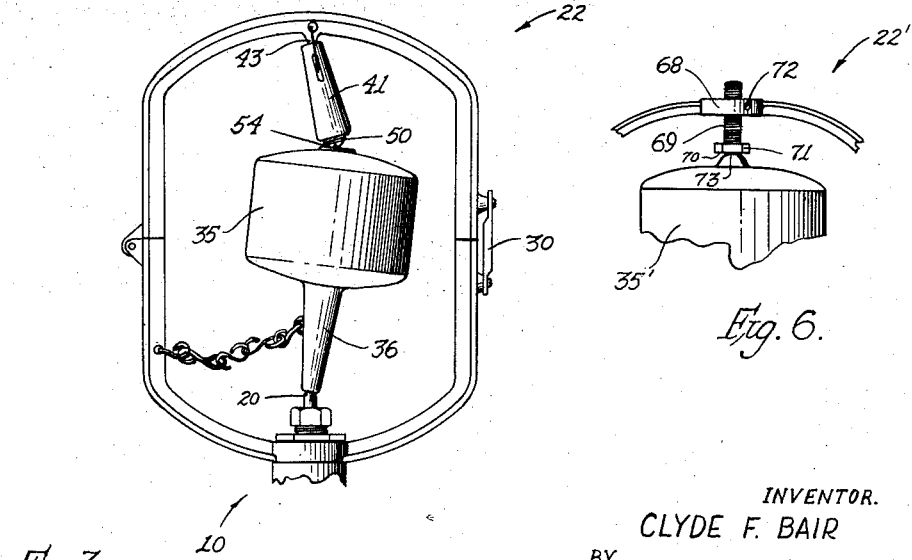
INVENTOR.
CLYDE F. BAIR
BY
R. W. Hodgson Sept. 23, 1958   C. F. BAIR   2,853,089
DISASTER VALVE ATTACHMENT
Filed Jan. 11, 1954   2 Sheets-Sheet 2
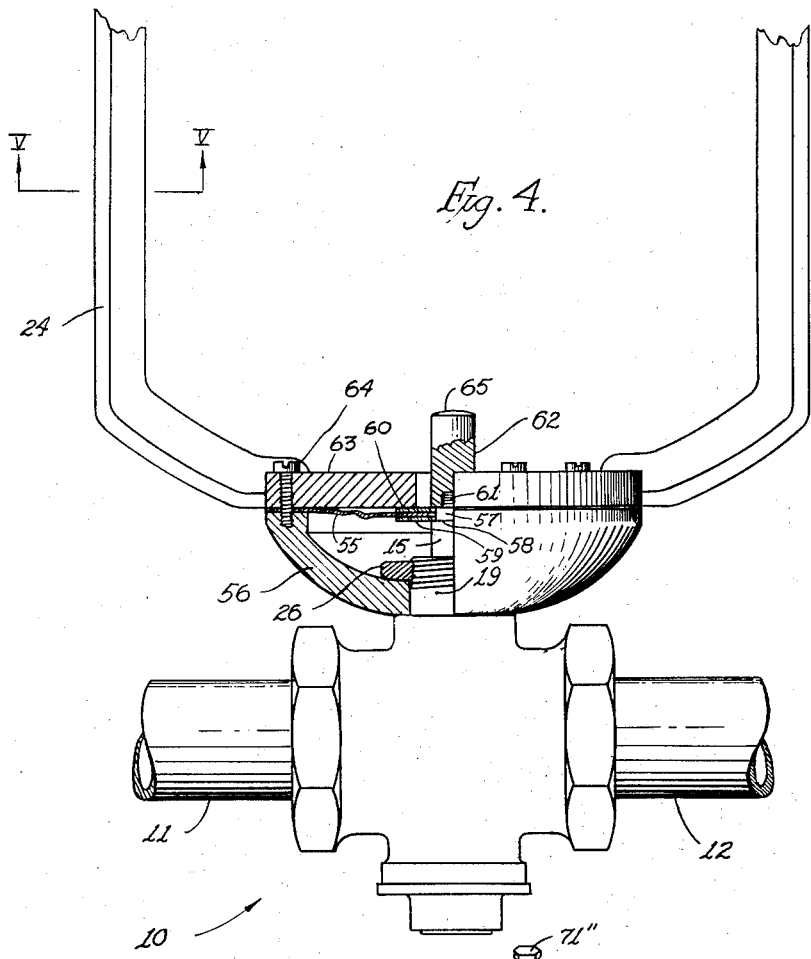
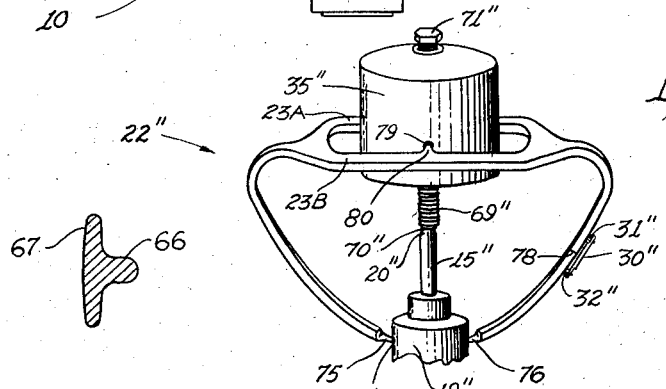
INVENTOR.
CLYDE F. BAIR
BY R. W. Hodgson

United States Patent Office 2,853,089
Patented Sept. 23, 1958

2,853,089

DISASTER VALVE ATTACHMENT

Clyde F. Bair, Long Beach, Calif.

Application January 11, 1954, Serial No. 403,241

6 Claims. (Cl. 137—39)

This invention relates generally to an improved shut-off valve attachment and, more particularly, to a shock and/or temperature sensitive valve attachment adapted to respond to an earthquake, explosion or fire to automatically shut off a spring-type pipe valve for prevention of a disaster which may be occasioned by the nature of the substance carried by the pipes.

There has long been a need for a device capable of automatically shutting off a pipe valve upon occurrence of an earthquake, explosion or fire because of the inherent danger in the continued flow of the substance in the pipes. Many attempts have been made to solve this problem, but each of the prior art devices has at least one major disadvantage, such as high initial cost, difficulty of maintenance, incapability of variable adjustment for different intensities of shock and/or temperature, criticalness of adjustment in setting or positioning the device, limitation of the device to upsetting in less than all possible directions in which the shock may occur, and so forth.

The present invention consists of a yoke adapted to be secured to a pipe valve with an extreme member of the yoke in distance-fixed relationship with respect to said pipe valve, and a large inert mass adapted to be positioned between the spring-biased valve stem and said extreme member of the yoke in stem-depressing opening relationship with respect to said pipe valve, said mass being adapted to be held in central alignment with respect to said valve stem by the force of the valve spring and having sufficient inertia to upset from said central alignment upon the occurrence of a suddenly applied force.

In one preferred form of my invention, the mass is in pivotal abutment against the upper end of the valve stem and in flat abutment against the lower end of an arm in upper pivotal abutment against the extreme member of the yoke, the occurrence of a sudden shock causing the mass to be upset relative to the other members by pivoting on the end of the valve stem and falling out of abutment against the arm.

In another preferred embodiment of my invention, the mass is in pivotal abutment against the upper end of the valve stem and in frictional abutment against the yoke, the occurrence of a sudden shock causing the mass to be upset by sliding out of abutment against the yoke and pivoting on the end of the valve stem.

In another form of the present invention, the mass is in frictional abutment aganist the upper end of the valve stem and pivotally mounted with respect to the yoke which is pivotally mounted with respect to the pipe valve.

In all of the embodiments of the present invention, means are provided for adjusting the device to upset at predetermined intensities of shock by selectively varying the distance the valve spring will be compressed, thus varying the force exerted by the compressed valve spring effectively against the mass and the yoke.

In all of the embodiments of the present invention, the yoke may, if desired, be formed of two separate parts which are hinged together at one side and connected together at the other side by a temperature sensitive fusible link adapted to melt at a selectively predetermined temperature of the surrounding atmosphere, such melting permitting the yoke to pivot on its hinge, thereby increasing the distance between the extreme portion of the yoke and the valve stem, causing the mass to be upset and the pipe valve to close.

From the above brief description, it will be obvious that the above-mentioned disadvantages of the prior art are completely or virtually completely overcome in and through the use of my invention.

With the above points in mind, it is an object of this invention to provide a shut-off valve attachment adapted to be responsive to the occurrence of an earthquake, explosion or other shock for shutting off a pipe valve.

A further object of this invention is the provision of an easily installed and positioned shut-off valve attachment requiring little or no maintenance and adapted to be readily reset by an inexperienced operator.

Another object of the present invention is the provision of a shock and/or temperature sensitive shut-off valve attachment effectively adapted to be selectively variably adjusted to upset at a predetermined intensity of shock and/or at a predetermined temperature of the surrounding atmosphere.

Additional and related objects will be clear to those skilled in the art upon a careful study of this specification, the following drawings and the appended claims.

In order to facilitate a more complete understanding of my invention, reference will be made to the following drawings, in which:

Fig. 1 is a front elevational view (partly broken away and partly in vertical section) of one embodiment of the present invention in operative position on an open spring-type plug valve;

Fig. 2 is an enlarged, fragmentary sectional view of the upper portion of the device illustrated in Fig. 1, as taken substantially along the line II—II in Fig. 1;

Fig. 3 is a view, similar in aspect to that of Fig. 1, showing the device in a position just prior to permitting the closing of the valve;

Fig. 4 is a partly sectional, fragmentary, enlarged, front elevational view of the lower portion of the embodiment illustrated in Figs. 1 through 3 in conjunction with a modified spring-type plug valve;

Fig. 5 is a sectional view of the yoke, taken substantially along the line V—V of Fig. 4;

Fig. 6 is a fragmentary, front elevational view of a modified embodiment of the present invention; and Fig. 7 is a perspective view of a third embodiment of the present invention in operative position on a spring-type valve.

In Fig. 1, there is shown a spring-type pipe valve, indicated generally at 10, being threadedly secured between left and right pipes 11 and 12, which may be adapted to carry petroleum, steam or other liquiform or gaseous substances. The pipe valve 10 has a dividing member 13 with a hole 14 for the passage of the substances from one of said pipes to the other. A valve stem 15 passes through the hole 14 and is provided with a valve plug 16 adapted to seat within and against the hole 14 in sealing relationship with respect thereto. A compressed coil spring 17 is in upwardly biasing abutment against the valve plug 16, thereby tending to maintain said valve plug against the hole or seat 14. The lower end of the spring 17 abuts against a bolt 18 which is adjustably threadably secured to the pipe valve 10. The valve stem 15 extends upwardly through the pipe valve's upper portion 19 in slidable engagement therewith, the valve stem's rounded tip 20 always being above a sealing nut 21 which is threadably secured to the valve's upper portion 19. The above described spring-type valve is one of a class well known in the art.

A yoke, indicated generally at 22, is composed of upper and lower halves 23 and 24, the lower half 24 being provided with a ring 25 which fits smoothly around the valve's upper portion 19 and is locked thereto by a lock nut 26. The two yoke halves 23 and 24 are held together at one place by a hinge pin 27 through two lateral projections 28 and 29 from the yoke halves 23 and 24, respectively. The two yoke halves 23 and 24 are held together at an opposing second place by a temperature sensitive fusible link 30 being bolted to two lateral projections 31 and 32 on the yoke halves 23 and 24, respectively, by two screws 33 and 34, respectively. Fusible links of the type shown are well known in the art and are so chosen that they melt at any predetermined temperature of the surrounding atmosphere. A large mass 35, being composed of any suitable heavy material, is integrally provided with a lower lever arm 36 having a concave tip 37 adapted to be pivotally positioned upon the valve stem's rounded tip 20. A loose chain 38 is effectively connected to the mass 35 through an eye screw 39 in the lever arm 36 and to the yoke 22 by insertion through a hole 40 in the lower half 24 of said yoke, the purpose of said chain being merely to retain said mass in proximity to the apparatus after said mass has fallen from its illustrated position, thereby keeping the mass handy for resetting of the apparatus. A hinge arm 41 has a concave upper end 42 in pivotal abutment against a convex point 43 directed downwardly from the yoke's upper half 23. A ring 44 is loosely engaged with the hinge arm 41 through a slot 45 therein and with the yoke's upper half 23 through a hole 46 therein, the purpose of said ring 44 being similar to that of the loose chain 38.

In Fig. 2, it is seen that the hinge arm 41 is provided with a screw 47 having a hemispherical or round head 48 directed downwardly. Two washers 49 and 50 are secured around the screw 47 between the screw head 48 and the lower surface 51 of the hinge arm 41. The large mass 35 has a flat upper surface 52 with a hemispherical or round depression 53 adapted to receive the round head 48 of the screw 47. As shown, the round head 48 has been positioned within the depression 53 in the mass 35 so that the flat upper surface 52 of said mass is in abutment against the washer 50 of the hinge arm 41, the function of the head 48 and the depression 53 being to index the positioning of the washer 50 on the surface 52.

Figs. 1 and 3 illustrate partially the manner of operation of the above-described apparatus. Fig. 3 may be assumed to illustrate a position of the device just prior to normal operative positioning with the spring valve open, or else just after leaving the normal position in response to a shock and prior to the permitting of the valve to close, Fig. 1 illustrating the normal operative position. In the normal operative position of Fig. 1, the hinge arm 41, the center of gravity of the laterally symmetrical large mass 35, the lower lever arm 36 and the valve stem 15 are in central alignment with respect to each other, the distance between the convex point 43 and the concave tip 37 being so great that the valve stem 15 is depressed, thereby compressing the valve spring 17 and opening the hole 14. The force of the valve spring 17 is sufficient to maintain the mass 35 in equilibrium during normal conditions. Upon the occurrence of an earthquake, however, everything except the mass 35 moves laterally in the direction of the shock, the mass 35 remaining relatively stationary because of its inertia due to its great weight, thus causing the mass 35 to pivot on its lever arm 36 about the valve stem's rounded tip 20, as is illustrated in Fig. 3. A point 54 on the lower outer edge of the washer 50 becomes a pivotal point between the hinge arm 41 and the mass 35, said pivotal point 54 also becoming the point of force-transmission between said hinge arm and said mass so that the vertical force exerted by the valve spring 17 is transmitted therethrough. Hence, the mass 35 will be upset and continue to fall out of its normal position when said pivotal point passes the central axis of the convex point 43 and the valve stem 15; if the shock were of minor intensity, the mass would pivot back into the normal position because its inertia would not provide sufficient resistive force to compress the valve spring 17 and depress the valve stem 15 enough to permit the pivotal point 54 to pass the central axis. Obviously, the intensity of the shock necessary to upset the mass depends upon the radius of the washer 50 and the force exerted by the compressed valve spring 17, assuming the size, weight and shape of all other parts remain constant. The apparatus can be adjusted to be upset by a predetermined intensity of shock by selection of the proper sized washer 50, the radius thereof being what may be called the upset distance, or by insertion of more or less washers, such as 49 and 50, of the same size, the number of such washers determining the amount of compression of the valve spring 17 and hence the vertical force to be overcome by the inertia of the mass 35, or the pre-set compression of the spring 17 can be adjusted.

The operation of the fusible link 30 should now be clear. If the temperature of the surrounding atmosphere rises to the predetermined value at which said link will melt, for example, 160 degrees, then the melting of the link 30 will permit the upward force exerted by the valve spring 17 to pivot the upper half 23 of the yoke 22 about the hinge pin 27, thereby releasing any retaining force upon the mass 35 which will thereupon be upset. Of course, the valve spring 17 will thereupon close the valve hole 14 with the valve plug 16.

Fig. 4 illustrates the means for attaching the yoke's lower half 24 to the spring-type valve 10 when said valve is provided with a diaphragm 55 adapted to prevent seepage or leakage of the substance carried by the pipes 11 and 12 through the clearance between the valve stem 15 and the pipe valve's upper portion 19. A bowl-shaped ring 56 fits smoothly around the valve's upper portion 19 and is locked thereto by the lock nut 26. The valve stem 15 has a circular recess 57 providing a shoulder 58 upon which rests a washer 59. The flexible circular diaphragm 55 fits around the recess 57 and rests upon the bowl-shaped ring 56 and the washer 59. Another washer 60, substantially identical to the first washer 59, fits around the valve stem recess 57 and upon the diaphragm 55. The valve stem 15 has a threaded projection 61 upon which a member 62 is threadably rotated in abutment against the washer 60 until the diaphragm 55 is sealed between the washers 59 and 60. The yoke's lower half 24 is integrally provided with a flat circular plate or ring 63 which is secured to the bowl-shaped ring 56 by several cap screws, such as 64, thereby sealing the diaphragm 55 between the two rings 63 and 56. The member 62 has a rounded tip 65, similar to the rounded tip 20 of the previously described valve stem 15 in Figs. 1 and 3. The mass (not shown) not being operatively positioned, the pipe valve 10 is closed; positioning of said mass will depress the valve stem 15 and open the valve, the diaphragm 55 having enough slack to allow free vertical movement of the valve stem 15. The yoke's upper half is not shown, being the same as in Figs. 1 and 3. The yoke may be provided with a fusible link and a hinge as previously described, thereby making the device responsive to temperature as well as shock.

Fig. 5 illustrates the cross-sectional shape of the yoke's lower half (as well as the upper half), there being an internal rib 66 projecting from an outer flange 67.

Fig. 6 illustrates a modified embodiment of my invention, similar parts being designated by the same numerals, primed however. Those portions not illustrated may be identical with the comparable portions illustrated in Figs. 1 and/or 4. The yoke 22' is provided with a circular top 68 adapted to threadably receive a bolt 69 having a flat lower surface 70 on its polygonal head 71. The bolt 69 is elevationally positionably adjustable with respect to the yoke's top 68 by rotation of said bolt, a set screw 72 being adapted to lock the bolt 69 in any given position. The large mass 35' has a convex upper tip 73 adapted to be in frictional abutment against the flat lower surface 70 of the bolt head 71.

The operation of the modified embodiment illustrated in Fig. 6 may be explained as follows:

The mass's lower lever arm (not shown) is pivotally positioned upon the valve stem's tip (not shown) in the same manner as previously described in connection with the first embodiment, and then the mass 35' is centrally aligned with respect to the central axis of the bolt 69 and the valve stem (not shown). The bolt 69 is rotated until the flat surface 70 is in abutment against the convex upper tip 73 of the mass 35', rotation of the bolt continuing until the valve stem is depressed the desired amount necessary to compress the valve spring (not shown) and open the valve hole (not shown). The frictional force between the tip 73 and the surface 70 will be sufficient to maintain the mass 35' in central alignment with respect to the bolt 69 and the valve stem (not shown) but insufficient to overcome the inertia of the mass 35' and prevent the upsetting of the mass from its centrally aligned relationship upon the occurrence of lateral shock due to an earthquake or some other sudden force. The frictional force may be adjusted by raising or lowering the bolt 69, thus adjusting the vertical force of the valve spring (not shown). The convex tip 73 may be provided with a very small flat portion on its end, or the flat surface 70 may be provided with a very small indentation in its center for the purpose of indexing the central alignment of the mass 35', if desired.

Fig. 7 illustrates another modified embodiment of the present invention, similar parts being designated by the same numerals, double-primed however. The yoke 22" is provided with two pivot projections 75 and 76 adapted to be inserted into two holes (of which the left hole 77 is seen) in the valve's upper portion 19", the yoke 22" thus being in pivotal relationship with respect to said upper portion 19" about an axis through the ends of the pivot projections 75 and 76. The fusible link 30" is secured to the two lateral projections 31" and 32" on either side of the split 78 in the yoke, a hinge (as in Figs. 1 and 3) in opposition to the link 30" being unnecessary in the present modified embodiment because the yoke 22" can pivot about the pivot projection 75 when the link melts. The mass 35" (adjacent the bottom thereof) is provided with two holes (of which the front hole 79 is seen), each adapted to pivotally retain a projection, such as 80, from the yoke's separated upper portions 23A and 23B, the mass 35" thus being in pivotal relationship with respect to the yoke 22" about an axis through the projection 80 and the other unseen projection on the other side of the mass. A bolt 69" is threadably rotatable within the mass 35" and provided with a flat lower surface 70" adapted to forcibly frictionally abut against the rounded tip 20" of the valve stem 15". The bolt head 71" may be manually rotated for forcible depression of the valve stem 15" so as to open the spring-type valve and to compress the valve spring (not shown) for the desired vertical force to maintain the mass 35" and the bolt 69" in central alignment with respect to the valve stem 15". The central axis of the valve stem 15", the pivotal axis of the pivot projections 75 and 76 and the pivotal axis of the projection 80 and its unseen counterpart are each at substantially right angles with respect to the other two axes, the mass 35" thus being upsettable by a shock in any direction, each pivotal mounting being sensitive to a vector component of the shock at right angles to the mounting's respective axis.

It should be noted that the examples described and illustrated herein are illustrative only and numerous modifications within the spirit and scope of the present invention will occur to those skilled in the art and all such are intended to be included and comprehended herein.

For example, the embodiment illustrated in Fig. 7 is merely a simplified form of a free-floating mass, in which case the yoke would be fixed to the pipe valve and the upper portion of the yoke could be provided with an internal circular grooved track adapted to loosely retain an annular track of ball bearings attached to the mass so that the mass would be free to upset upon the occurrence of a shock of the same magnitude in any direction.

Although all of the embodiments illustrated are provided with concave, convex, rounded, depressed, and/or flat contacting surfaces or members in cooperable relationships with respect to each other, the use of any particular types or combinations of contacting surfaces or members is not intended to be limiting since there are numerous ways, including those illustrated, of obtaining frictional and/or pivotal abutment of the various surfaces and members with respect to each other. Some of the variations in the curvature of the surfaces and/or members may serve the sole function of indexing the central alignment of the mass with respect to the valve stem, whereas other variations may be directly related to adjustment of the upset distance.

The exact compositions, configurations, relative positionings, and cooperative relationships between the various component parts of the present invention are not critical and can be modified substantially within the spirit hereof.

The embodiments of the present invention specifically described, illustrated and claimed herein are exemplary only, and are not intended to limit the scope of the present invention, which is to be interpreted in the light of the prior art and the appended claims only, with due consideration for the doctrine of equivalents.

I claim:

1. Valve attachment apparatus being adapted to be attached to a spring valve in selectively opening relationship with respect thereto and being effectively adapted to be responsive to the sudden application of force for the closing of said valve upon the occurrence of said force, comprising: yoke means adapted to be cooperably secured to a spring-type pipe valve, said yoke means being provided with an extreme member cooperable to be in distance-fixed relationship with respect to said pipe valve; a large inert mass cooperable to be positioned in fulcrum contact with the spring-biased valve stem of said pipe valve; hinge arm means being in pivotal abutment against said extreme member of said yoke means and in cooperable arcuately separable abutment against said mass; said mass and said hinge arm means being adapted to be in cooperable central alignment and force-transmission relationship with respect to said valve stem and said extreme member of said yoke means whereby the sudden application of force to said pipe valve will cause said mass to be upset from said central alignment and force-transmission relationship.

2. Valve attachment apparatus as defined in claim 1 including: temperature sensitive fusible link means in cooperable relationship with respect to said extreme member of said yoke means whereby the occurrence of a predetermined temperature of the surrounding atmosphere causes said link means to melt and permits the mass-upsetting increase of the distance between said extreme member and said pipe valve.

3. Valve attachment apparatus being adapted to be attached to a spring valve in selectively opening relationship with respect thereto and being effectively adapted to be responsive to a predetermined temperature and to the sudden application of force for the closing of said valve upon the occurrence of either said temperature or said force, comprising: yoke means adapted to be cooperably secured to a spring-type pipe valve, said yoke means being provided with an extreme member in distance-fixed relationship with respect to said pipe valve; bolt means being threadedly vertically secured to said extreme member and provided with a planar lower surface; a large inert mass cooperable to be positioned in fulcrum contact with the spring-biased valve stem of said pipe valve and in frictional arcuately separable abutment against said planar lower surface of said bolt means whereby said mass may be in central alignment and force-transmission relationship with respect to said valve stem and said extreme member; said bolt means being selectively vertically adjustably positionable whereby the vertical force exerted by said spring-biased valve stem may be selectively varied; and temperature sensitive fusible link means in cooperable relationship with respect to said extreme member of said yoke means whereby the occurrence of a predetermined temperature of the surrounding atmosphere causes said link means to melt and permits the mass-upsetting increase of the distance between said extreme member and said pipe valve.

4. Valve attachment apparatus being adapted to be attached to a spring valve in selectively opening relationship with respect thereto and being effectively adapted to be responsive to the sudden application of force for the closing of said valve upon the occurrence of said force, comprising: yoke means adapted to be cooperably secured to a spring-type pipe valve, said yoke means being provided with an extreme member cooperable to be in distance-fixed relationship with respect to said pipe valve; abutment means carried by said extreme member of said yoke means; and a large inert mass cooperable to be positioned in fulcrum contact with the spring-biased valve stem of said pipe valve and in pivotal abutment above its center of gravity with respect to said abutment means carried by said extreme member of said yoke means and in central alignment and force-transmission relationship with respect to said valve stem and said abutment means carried by said extreme member of said yoke means, said mass being effectively adapted to be upset from said central alignment and force-transmission relationship by the sudden application of force to said pipe valve.

5. Valve attachment apparatus being adapted to be attached to a spring valve in selectively opening relationship with respect thereto and being effectively adapted to be responsive to the sudden application of force for the closing of said valve upon the occurrence of said force, comprising: yoke means adapted to be cooperably secured to a spring-type pipe valve, said yoke means being provided with an extreme member cooperable to be in distance-fixed relationship with respect to said pipe valve; abutment means carried by said extreme member of said yoke means; and a large inert mass cooperable to be positioned in fulcrum contact with the spring-biased valve stem of said pipe valve and in pivotal and separable abutment above its center of gravity with respect to said abutment means carried by said extreme member of said yoke means whereby said mass may be in central alignment and force-transmission relationship with respect to said valve stem and said abutment means carried by said extreme member, said mass being effectively cooperable to be upset from said central alignment and force-transmission relationship by the sudden application of force to said pipe valve.

6. Valve attachment apparatus being adapted to be attached to a spring valve in selectively opening relationship with respect thereto and being effectively adapted to be responsive to the sudden application of force for the closing of said valve upon the occurrence of said force, comprising: yoke means adapted to be cooperably secured to a spring-type pipe valve, said yoke means being provided with an extreme member cooperable to be in distance-fixed relationship with respect to said pipe valve; abutment means carried by said extreme member of said yoke means; and a large inert mass cooperable to be positioned in fulcrum contact with the spring-biased valve stem of said pipe valve and in pivotal and frictionally separable abutment above its center of gravity with respect to said abutment means carried by said extreme member of said yoke means whereby said mass may be in central alignment and force-transmission relationship with respect to said valve stem and said abutment means carried by said extreme member, said mass being effectively cooperable to be upset from said central alignment and force-transmission relationship by the sudden application of force to said pipe valve.

References Cited in the file of this patent

UNITED STATES PATENTS

| | | |
|---|---|---|
| 704,529 | Foskett | July 15, 1902 |
| 1,082,107 | Carlson | Dec. 23, 1913 |
| 2,615,461 | Crow | Oct. 28, 1952 |